United States Patent
Kirks

[19]

[11] Patent Number: 6,014,891

[45] Date of Patent: Jan. 18, 2000

[54] ON-LINE LEAK TESTED AND CONTAINER ENDS

[75] Inventor: Kelly Kirks, Denver, Colo.

[73] Assignee: Conal Engineering Inc., Golden, Colo.

[21] Appl. No.: 09/074,583

[22] Filed: May 8, 1998

[51] Int. Cl.[7] .................................................. G01N 3/26
[52] U.S. Cl. .............................................. 73/40; 73/45.1
[58] Field of Search .................................. 73/40, 41, 45, 73/45.1, 45.2, 49.8

[56] References Cited

U.S. PATENT DOCUMENTS

| | | |
|---|---|---|
| 2,330,229 | 9/1943 | Maher ........................................ 73/40 |
| 3,499,314 | 3/1970 | Roberts et al. ........................ 73/45.2 |
| 3,792,606 | 2/1974 | Munger ...................................... 73/40 |
| 3,875,789 | 4/1975 | Orosy ......................................... 73/40 |
| 3,875,790 | 4/1975 | Herdzina et al. ......................... 73/40 |
| 3,954,003 | 5/1976 | Dobbins .................................... 73/40 |
| 4,096,736 | 6/1978 | Moshier .................................... 73/40 |
| 4,440,016 | 4/1984 | Konagaya et al. ....................... 73/40 |
| 4,495,797 | 1/1985 | Cassell, Jr. et al. ..................... 73/40 |
| 5,042,289 | 8/1991 | Jensen ....................................... 73/40 |

*Primary Examiner*—Michael Brock
*Attorney, Agent, or Firm*—Edwin H. Crabtree; Ramon L. Pizarro; Donald W. Margolis

[57] ABSTRACT

A container end leak testing device used for testing a container end. The container end having a score line defining an opening in the container end and a pull tab. The pull tab used for creating the opening therein. The leak testing device includes a pressure transducer disposed directly above a top of the container end to be tested. The pressure transducer, under computer control, is able to test for small volumes of air pressure leaks, ie. 0.1 cubic centimeters and less. The leak testing device also includes a tester housing, an upper housing member, a lower housing member and a container end test pocket disposed between the two housing members. The upper housing member includes the pressure transducer mounted thereon and having an air passage communicating with the test pocket. Also, the upper housing member includes two downwardly extending guide pins and an air actuated stop pin for centering the container end inside the test pocket. The lower housing member moves up and down in the lower portion of the tester housing. The lower housing member includes a spring biased base plunger for engaging the bottom of the container end and compressing the top of the container end against a flat annular ring disposed in the bottom of the upper housing member. The lower housing member and base plunger include an air passage therein for introducing test air pressure in and around the bottom and sides of the container end to determine if any air passes through any leaks in the container end and is sensed by the pressure transducer.

14 Claims, 4 Drawing Sheets

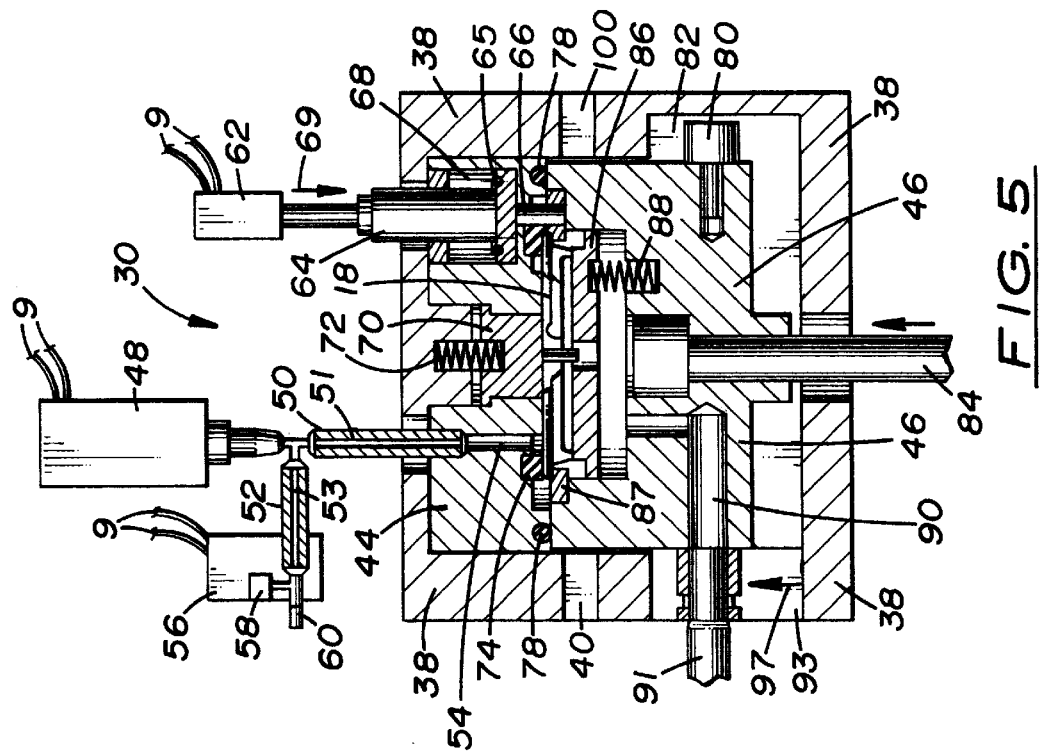
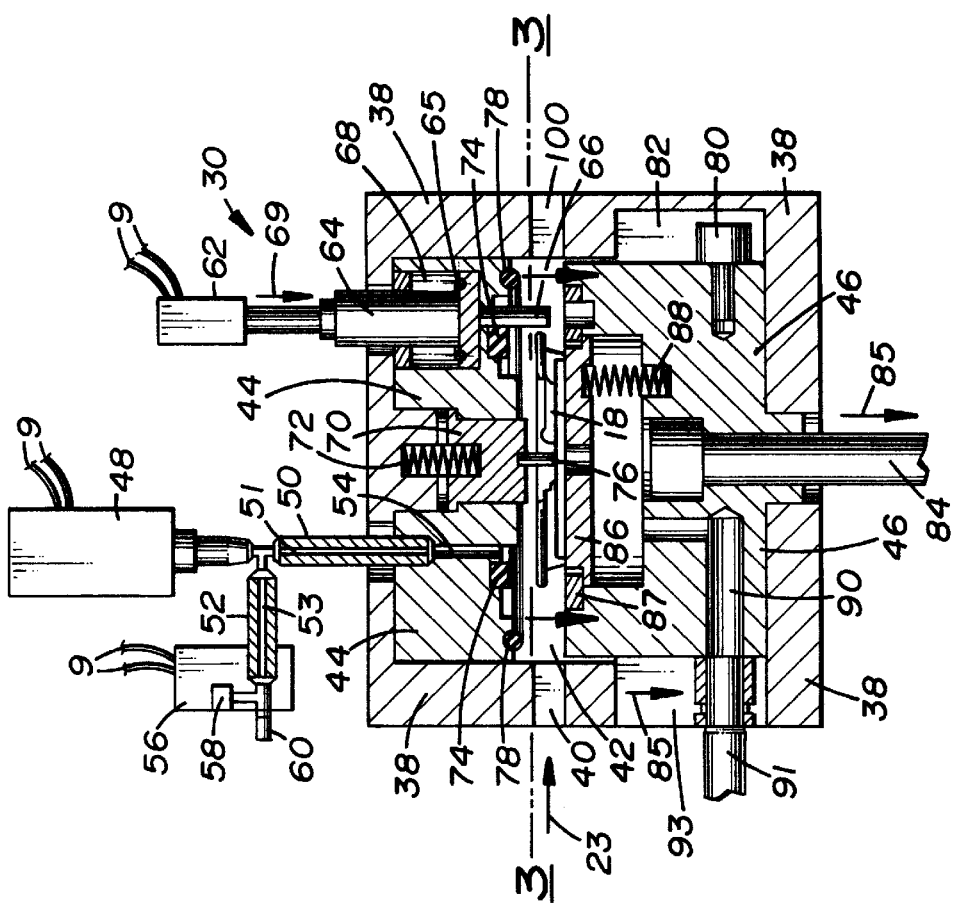

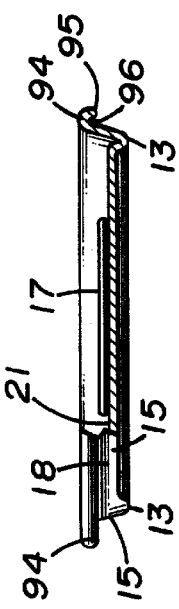
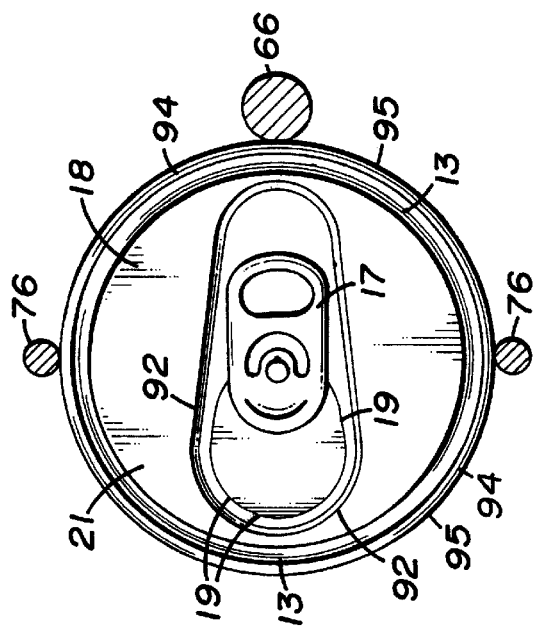
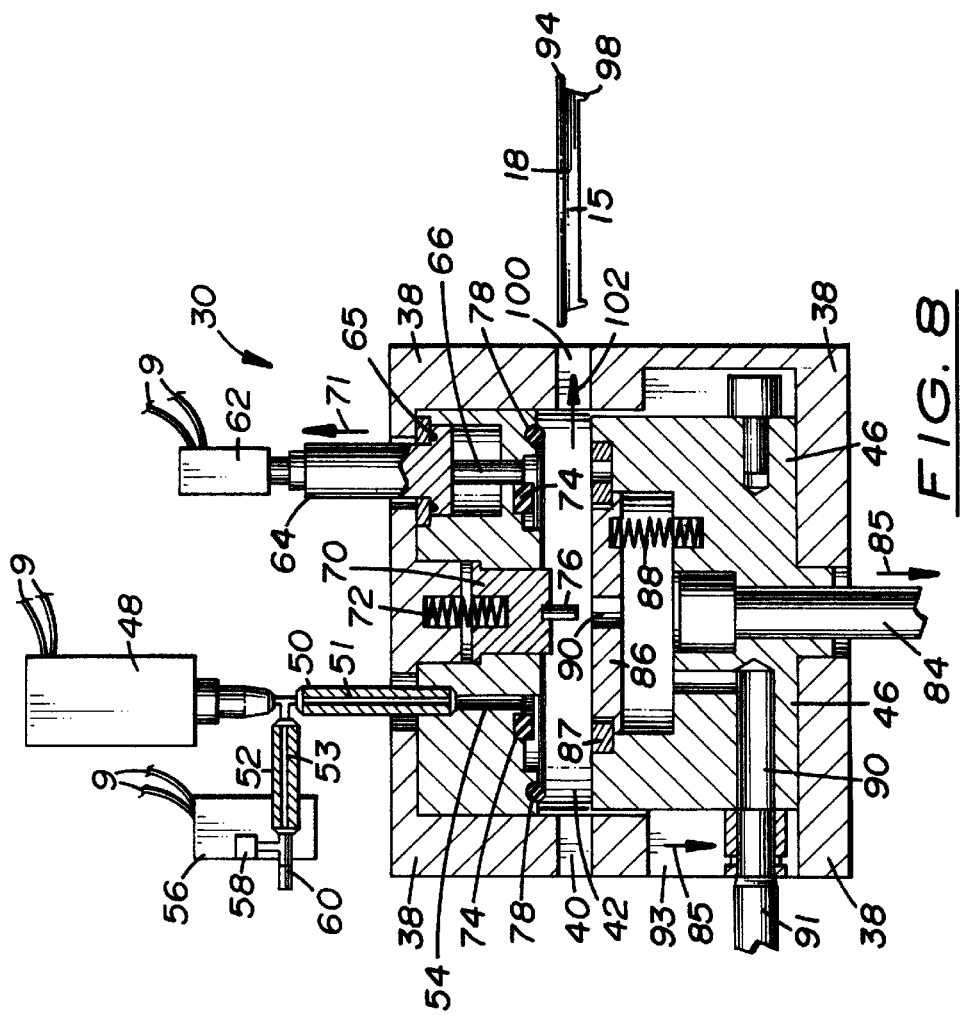

ON-LINE LEAK TESTED AND CONTAINER ENDS

BACKGROUND OF THE INVENTION (a) Field of the Invention

This invention relates to a testing device for containers used in the beverage and food industry and more particularly, but not by way of limitation, to a container end testing device for testing the surface area of a container end prior to the sealing of the container end to the container.

(b) Discussion of Prior Art

Today, millions of cans of soft drinks, beer and other products are sold each day. Most of these containers include a pull tab with a score line defining an opening in a container end. The pull tab is used for creating an opening in the container end. Because of the score line and the pull tab, careful control of the forming operation of the container end must be maintained in order that each container can be opened with little effort and still not leak under internal pressure from the carbonation of the product stored inside the container.

Heretofore, there have been a variety of different types of container testing devices and apparatus for testing for leaks in container ends.

In U.S. Pat. No. 4,440,016 to Konagaya, et al., a method for high-speed leak testing of container ends is disclosed. The method of this invention is achieved by the use of a closed chamber which encloses the container end therein. Pressurized air is injected into the upper closed portion of the chamber to test whether the container end has a leak by measuring the corresponding change in air pressure within the closed portion of the chamber. This reference is representative of prior art references which utilize standard O-rings to seal the container end.

In U.S. Pat. No. 3,399,563 to Helms, a method and apparatus for leak testing container ends is also described. This reference makes use of standard O-rings for sealing the container end within the test chamber. The primary relevance of this reference is that a sensing element is placed directly adjacent the testing chamber in order to detect a change in environmental conditions which indicates a leaking container end. More specifically, the sensor in this invention detects high frequency vibrations caused by high pressure air leaking through the container end.

In U.S. Pat. No. 4,495,797 to Cassell, Jr., et al., an apparatus for leak testing container ends is disclosed. This reference is also representative of testing devices which incorporate standard O-rings and use of a pressure transducer which is remote from the testing chamber. A positive control feed mechanism is used to introduce the container ends into the testing chamber.

In U.S. Pat. No. 4,096,736 to Moshier, an ultrasonic leak detection apparatus and method is described. The primary relevance of this reference is the disclosure of a flat surface to seal the container end within the testing chamber, as opposed to the use of standard O-rings.

In U.S. Pat. No. 5,042,289 to Jensen, the use of a flat surface to seal the container end is disclosed. This reference discloses air pressure applied to one side of the container end, and such pressure is used to seal the annular peripheral rim of the opposite face of the container end against a flat seal to establish a seal without gripping or otherwise contacting the container end.

In U.S. Pat. No. 3,954,003 to Dobbins, yet another container end tester is described utilizing pressurized air. This reference emphasizes the use of a seating means in conjunction with a reciprocating pin in order to stabilize the container end being tested.

In U.S. Pat. No. 3,792,606 to Munger a leak detection apparatus is described which teaches the use of a flat seal and a sensing element which is directly mounted to the testing chamber. However, in this case, leak detection is achieved not by a pressure transducer but through a diaphragm which senses vibrations created by pressurized air which may leak through the container end.

In U.S. Pat. No. 5,086,653 to Bagwell, an apparatus for measuring forces applied to a pull tab of a container end during the formation of an opening in the container is disclosed. Although this reference does not disclose a device used for leak testing, it discloses the use of a gravity feed chute 12 in order to introduce container ends into the apparatus.

U.S. Pat. No. 3,499,314 to Robert, et al., is representative of another type of device used for leak testing container ends, and U.S. Pat. No. 5,123,278 to McKittrick discloses a pressure tester and method for buckle testing of containers.

Perhaps the most relevant prior art reference is a container tester called a "SPOT" machine which is manufactured by the subject assignee, Conal Engineering Inc., Golden, Colorado for Metal Container Corp. The "SPOT" machine uses a double stroking cylinder in order to bring the testing pocket down while the subject container end testing device utilizes a single stroke cylinder to bring a lower housing upwards for engaging the container end to be tested. The "SPOT" machine utilizes a four-pin arrangement to guide and stabilize the container end while the testing device described herein utilizes a three-pin arrangement with a retractable stop pin and two stationary guide pins. Further, the "SPOT" machine has a transducer remote from the testing chamber while subject invention has a pressure transducer placed directly next to the testing chamber.

None of the above mentioned patents and prior art container end testing devices have the advantages and unique combination of features, structure and function when compared to the subject container end leak testing device as described herein.

SUMMARY OF THE INVENTION

In view of the foregoing, a primary objective of the subject invention is to provide a container end testing device which will determine if a container end has large or small leaks therein and will also check if there are any small microscopic leaks over 90 to 95 percent of the surface area of the container end under test.

Another object of the testing device is through the use of a pressure transducer connected directly to the test pocket, the testing device is capable of testing for small volumes of air pressure leaks of 0.1 cubic centimeters and less for greater accuracy and quality control when checking container ends.

Still another object of the invention is the testing device includes a housing with an upper housing member having two downwardly extending guide pins and an air actuated stop pin for centering the container end inside the test pocket for proper alignment prior to the testing for leaks in the container end.

Yet another object of the invention is the container end testing device is readily adaptable for connecting to existing container end conveyor lines. The testing device provides "on-line" continuous testing so that a certain percent of container ends per minute are blow off the conveyor lines and gravity fed into the testing device for quickly and accurately determining if any container end leaks. The testing device can also be used for off-line testing.

Still another object of the container end tester is the use of a flat surface annular seal in the upper housing member for engaging the curl ring around the top of the container end and providing a tight seal inside the test pocket in the housing during the leak testing of the container end.

The leak testing device includes a pressure transducer disposed directly above a top of the container end to be tested. The pressure transducer, under computer control, is able to test for small volumes of air pressure leaks, ie. 0.1 cubic centimeters and less. The leak testing device also includes a tester housing, an upper housing member, a lower housing member and a container end test pocket disposed between the two housing members. The upper housing member includes the pressure transduced mounted thereon and having an air passage communicating with the test pocket. Also the upper housing member includes two downwardly extending guide pins and an air actuated stop pin for centering the container end inside the test pocket.

The lower housing member moves up and down in the lower portion of the tester housing. The lower housing member includes a spring biased base plunger for engaging the bottom of the container end and compressing the top of the container end against a flat annular ring disposed in the bottom of the upper housing member. The lower housing member and plunger include an air passage therein for introducing test air pressure in and around the bottom and sides of the container end to determine if any air passes through any leaks in the container end and is sensed by the pressure transducer.

These and other objects of the present invention will become apparent to those familiar with container testing devices, apparatus and methods from the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 2 is a sectional view of the tester housing cut away to expose a container end received through an entrance port in the housing. The container end is shown positioned in the test pocket and aligned ready for testing for leaks. The pressure transducer and solenoid valve are shown attached to an upper housing member. The pressure transducer is used for sensing and measuring small leaks when air pressure is applied to the bottom of the container end in the test pocket.

FIG. 3 is an enlarged top view of the container end taken along lines 3—3 shown in FIG. 2. Two guide pins and an air actuated stop pin are shown in cross section in this drawing. The three pins are used for centering and aligning the container end inside the test pocket.

FIG. 4 is a side view of the container end shown in FIG. 3 with a portion of the container end cut away to illustrate a pull tap and an outer curl ring with a cut edge ring. The cut edge ring is used for crimping the container end to the sides of a container.

FIG. 5 is a sectional view of the tester housing cut away to expose a container end positioned in the test pocket and aligned ready for testing for leaks. A lower housing member with a spring biased base plunger has been raised a air actuator rod. The plunger has engaged a lower countersink ring in the container end and compressed an upper outer curl ring against a flat annular ring disposed in a flat ring in the bottom of the upper housing member.

FIG. 8 is a sectional view of the tester housing cut away to expose a container end exiting the test pocket by gravity and to the right through an exit port in the housing. Prior to the container end leaving the test pocket, the lower housing member and base plunger are lowered as shown in the drawing. A spring biased knock-off plunger mounted in the bottom of the upper housing is used for releasing the container end from the test pocket.

DESCRIPTION OF THE PREFERRED EMBODIMENTS

Figure 1:
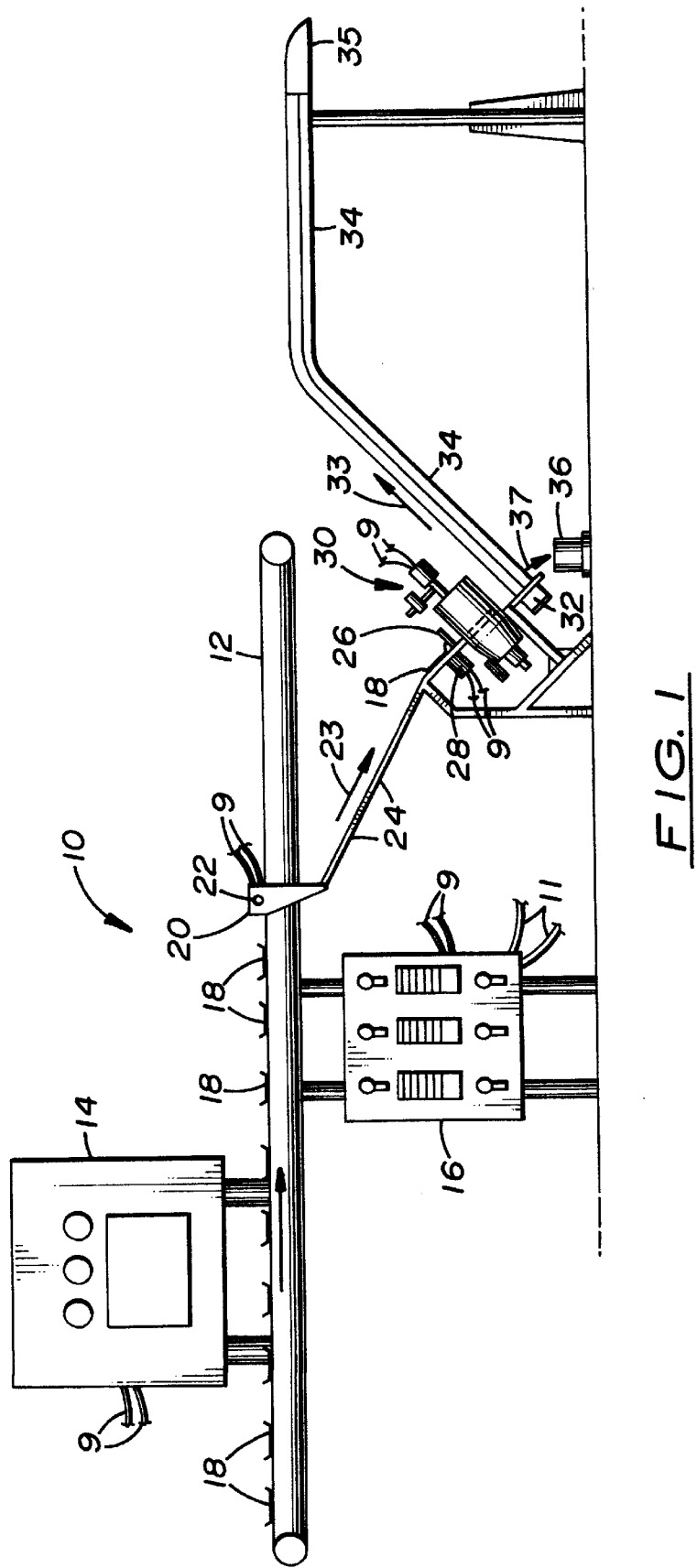
FIG. 1 is a side view of a typical container end conveyor system with control panel, pneumatic panel, conveyor and trackwork mounted next to the conveyor. A certain percent of container ends are blow off of the conveyor belt and feed by gravity into a test pocket of the subject container end leak tester.

In FIG. 1, a side view of a typical container end conveyor system is shown having general reference numeral 10. The conveyor system includes an endless conveyor belt 12 with a control panel 14 and a pneumatic panel 16. The conveyor belt 12 is shown with a plurality of container ends 18 disposed thereon. For example, 600 container ends per minute are feed onto the conveyor belt 12 and transported thereon for crimping and sealing to the tops of containers. The containers are used for different types of soft drink beverages, beer and other types of food products wherein carbonation in the product can apply air pressure inside the can and cause pressure leaks if one or more leaks occur in the container end 18. The containers are not shown in the drawings. Each of the container ends 18 include countersink ring 13, a chuck wall 15, a pull tab 17 and a score line 19. The score line 19 defines an opening in a panel 21 of the container end 18. These features of the container end 18 are shown in FIG. 3.

It should be noted that the control panel 14 includes a programmable computer for operating the pneumatic panel 16 and the various electronic and pneumatic components of the container end leak testing device which is described in detail below. While the control panel 14 with computer and pneumatic panel 16 are not part of the subject invention, they provide the necessary synchronization of the operation of the testing device with testing for leaks in the container ends. Extending outwardly from the control panel 14 and the pneumatic panel 16 are electrical leads 9 and pneumatic hoses 11 for connection to the various electrical components and air operated components of the container end leak testing device.

In the interest of quality control and preventing both large leaks and small microscopic leaks in the container ends 18, the ends are blow off the conveyor belt 12 periodically using a blow off valve 20 with air nozzle 22. For example, 2 percent of the container ends 18 are blow off for testing for leaks. The container ends 18 are received onto trackwork 24 and are feed downwardly by gravity, as indicated by arrow 23. The trackwork 24 is angled downwardly in a range of 45 degrees from the horizontal. The container ends 18 are received against a side of a sensor stop pin 26, which is part of a photo eye sensor 28. The sensor 28 senses when a container end 18 is present. When a container end 18 is ready to be tested for leaks, the sensor 28, under computer control, lowers the sensor stop pin 26 and the container end 18 slides downwardly into the subject container end leak tester. The leak testing device 30 is designated by general reference numeral 30.

After the container end 18 is tested for leaks in the leak testing device 30, the container end 18 exits the device 30 and continues to slide downwardly into an upstacker and tube cylinder 32 which is also under computer control. If the container end 18 is a non-leaker it is upstacked, as indicated by arrow 33, onto an accumulation tray 34 and a bagging horn 35 for being bagged and labeled good product for sale. If the computer, operating the control of the leak testing device 30, indicates that container end 18 is a leaker, then the upstacker and tube cylinder 32 drop the leaker into a reject catch tray 36, as indicated by arrow 37.

The computer programmed for controlling the blow off valve 20, the photo eye sensor 28, the upstacker and tube cylinder 32 and the various air operated components and electronic components of the leak testing device 30 is mounted inside the control panel 14 and connected thereto via electrical leads 9. The programmed computer is not shown in the drawings.

In FIG. 2, a sectional view of the subject invention is shown with the test device 30 having a tester housing 38 cut away to expose a container end 18 received through an entrance port 40 in the housing 38. The container end 18 is shown positioned in a test pocket 42 and aligned ready for testing for leaks. The tester housing 38 includes an upper housing member 44 and a lower housing member 46.

The upper housing member 44 includes a pressure transducer 48 which is under computer control and connected to a first nipple 50 and a second nipple 52. The first nipple 50 is mounted in the top of the upper housing member 44 and connected to an air passage 54 which communicates with the test pocket 42. The second nipple 52 is connected to a solenoid 56 having a solenoid valve 58. The solenoid valve 58 is shown in this drawing in an open position for allowing air pressure to escape to atmosphere from the test pocket 42, through the nipples 50 and 52, past the solenoid valve 58 and out an air vent 60 mounted in the side of the solenoid 56. The solenoid 56 is also under computer control. The pressure transducer 48 is used for sensing and measuring small leaks when air pressure is applied to the bottom of the container end 18 in the test pocket 42. It should be noted that the first and second nipples 50 and 52 shown in cross section include an air passage 51 through the first nipple 50 and an air passage 53 through the second nipple 52. The air passages 51 and 53 are less than 0.10 inches for measuring small amounts of volumes of air leakage for greater accuracy in checking for minuscule leaks in the container ends 18.

Also, mounted above the upper housing member 44 is an air actuator 62 which is under computer control. The air actuator 62 includes a stop pin piston 64 with an "O" ring seal 65 and a stop pin 66. The stop pin 66 extends downwardly from the piston 64 and is used to provide a stop for the container end 18 when it is received inside the test pocket 42. A lower portion of the stop pin piston 64 and "O" ring seal 65 are shown received in a cylinder 68 in the upper housing 38. In FIG. 2, the air actuator 62 has been actuated for moving the stop pin piston 64 downwardly, as indicated by arrow 69, with a lower portion of the stop pin 66 received in the test pocket 42. A leading edge of the container end 18 is shown in this drawing resting against a side of the stop pin 66.

Further, in a lower portion of the upper housing member 44 is mounted a container end knock-off plunger 70 which is spring biased by a coil spring 72 mounted therein. A bottom of the plunger 70 is used to engage a portion of the top of the container end 18 when it is compressed inside the test pocket 42. Also disposed in the lower portion of the upper housing member 44 and in the top of the test pocket 42 is an inner flat annular ring 74 for engaging the container end 18 when testing for leaks. Also, a pair of guide pins 76 are attached to the lower portion of the upper housing member 44 and act as a guide along with the stop pin 66 for aligning the container end 18 in the test pocket 42. A cross-section of the guide pins 76 is shown in FIG. 3. Still further, the lower portion of the upper housing member includes an outer "O" ring seal 78 for preventing air pressure from escaping out the sides of the test pocket 42 during the testing of the container end 18.

The lower housing member 46, acting like a piston, rides up and down inside a lower portion of the tester housing 38 and is guided by a cam roller 80 in a slot 82 in the tester housing 38. The lower housing member 46 is moved up and down using an air actuator rod 84 connected to an air cylinder under computer control. The air cylinder operates under air pressure in a range of 90 to 100 psi and is not shown in the drawings. In FIG. 2, the lower housing member 46 is shown in a lowered position as indicated by arrows 85.

Mounted in the top of the lower housing member 46 is an annular base plunger 86 and a hardened ring 87. The plunger 86 is mounted on four coil springs 88 with one end of the springs mounted in the upper portion of the lower housing member 46 and equally spaced therearound. Only one of the coil springs 88 is shown in the drawings. The plunger 86 is shown engaging the bottom of the container end 18 in this drawing.

Test air pressure, in a range of 40 psi, is applied to the underside of the container end 18 via an air line 91 attached to an air passage 90 in a side and in a lower portion of the lower housing member 46 and through the center of the base plunger 86 and ring 87. The air line 91, connected to the air passage 90, rides up and down in a slot 93 in the side of the tester housing 38.

In FIG. 3, is an enlarged top view of the container end 18 is shown taken along lines 3—3 shown in FIG. 2. Also, two guide pins 76 and an air actuated stop pin 66 are shown in cross section. As mentioned above, three pins are used for centering and aligning the container end inside the test pocket 42.

In this view, the pull tab 17 can be seen for providing an opening in the container end 18 along the score lines 19. The score lines 19 and pull tab 17 are surrounded by an indent 92 formed in the panel 21 of the container end 18. Also seen in this drawing is an upper curl ring 94 with an outer annular cut edge 95 which is used for wrapping around and crimping the container end 18 to the top of a container. Also seen in this drawing is a top view of the countersink ring 13 disposed next to the curl ring 94.

In FIG. 4, a side view of the container end 18 shown in FIG. 3 with a portion of the container end cut away to show a side view of a pull tap 17 and the upper curl ring 94 with the outer annular cut edge 95. Disposed under the curl ring 94 and next to the cut edge 95 is an annular container seal 96 which provides a seal when the curl ring 94 is crimped to the top of a container. Also shown in this drawing is a side view of the annular chuck wall 15 around the sides of the container end 18 and the countersink ring 13 formed in the bottom of the container end 18.

In FIG. 5, a sectional view of the tester housing 38 is shown cut away to expose the container end 18 positioned in the test pocket 42 and aligned ready for testing for leaks. The lower housing member 46 and base plunger 86 have been raised in the tester housing 38, as indicated by arrow 97, by the air actuator rod 84. The base plunger 86 is compressed against the bottom of the countersink ring 13 of the container end 18. At the same time, the hardened ring 87 engages the outer annular cut edge 95 of the container end 18 and moves the container end 18 upwardly compressing the curl ring 94 against the flat annular ring 74 in the upper housing member 44. The flat ring 74 providing a more reliable seal because of the round nature of the upper portion of the curl ring 94. Also, sides of the lower housing member 46 are compressed against the outer "O" ring 78 in the upper housing member 44 for preventing leakage out the sides of the test pocket 42. Further, the solenoid 56 has been actuated and the solenoid valve 58 has moved downwardly closing the escape of air pressure out the air vent 60.

Figure 6:
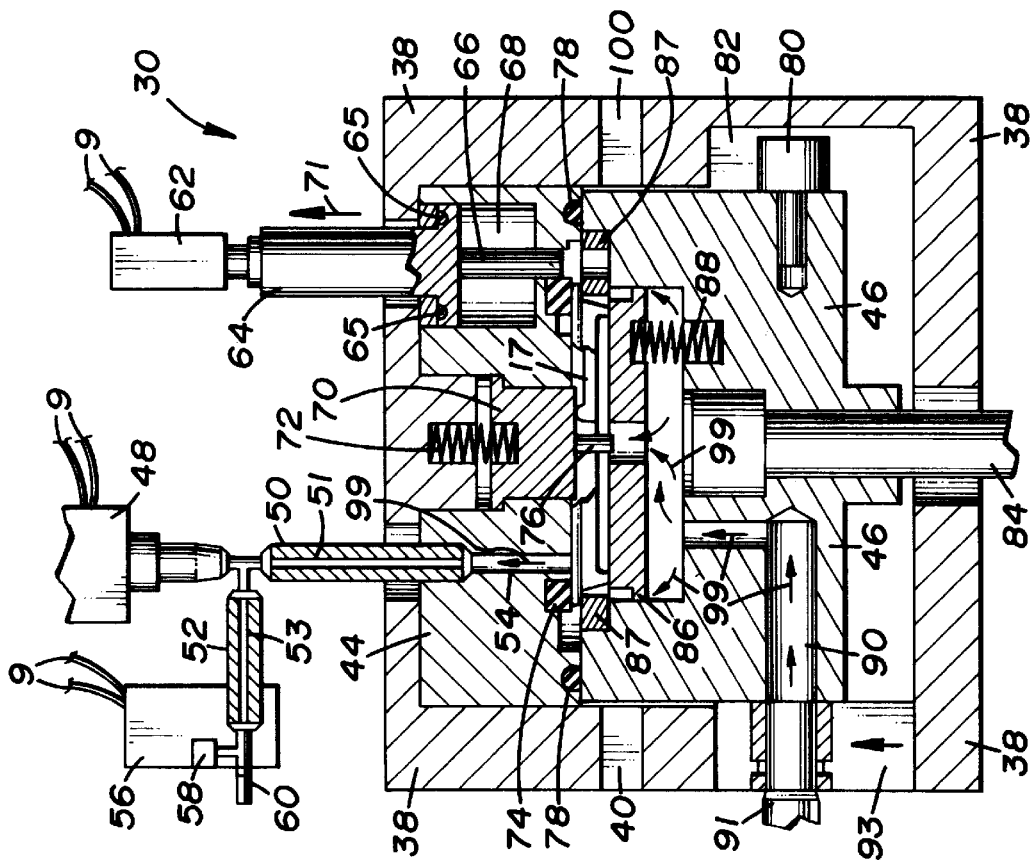
FIG. 6 is an enlarged sectional view of the tester housing cut away to expose a container end positioned in the test pocket with air pressure introduced through an air passage in the lower housing member and the base plunger. The air pressure is applied on the bottom of a container end panel and around the sides of a chuck wall of the container end. In this drawing, there is no leakage in the container end.

In FIG. 6, an enlarged sectional view of the leak testing device 30 is shown with the tester housing 38 cut away to expose a container end 18 positioned in the test pocket 42 with air pressure introduced through the air passage 90 in the lower housing member 46, the base plunger 86 and the ring 87. The air pressure is in a range of 40 psi and is shown as arrows 99. The air pressure 99 is applied on the bottom side of a container end panel 21. Also, the air pressure 99 is allowed to go around the sides of the base plunger 86 to the outside of the chuck wall 15 of the container end 18 and under the curl ring 94 as shown by arrows 99.

In FIG. 6 there is no leakage in the container end 18 as shown. Further, in this drawing, the air actuator 62 has been activated prior to the introduction of the test air pressure 99 and the stop pin piston 64 and stop in 66 have been raised in the cylinder 68 as indicated by arrow 71. The "O" ring seal 65 is now compressed against the top portion of the wall of the cylinder 68 to prevent any the test air pressure from leaking to the outside of the tester housing 38.

Figure 7:
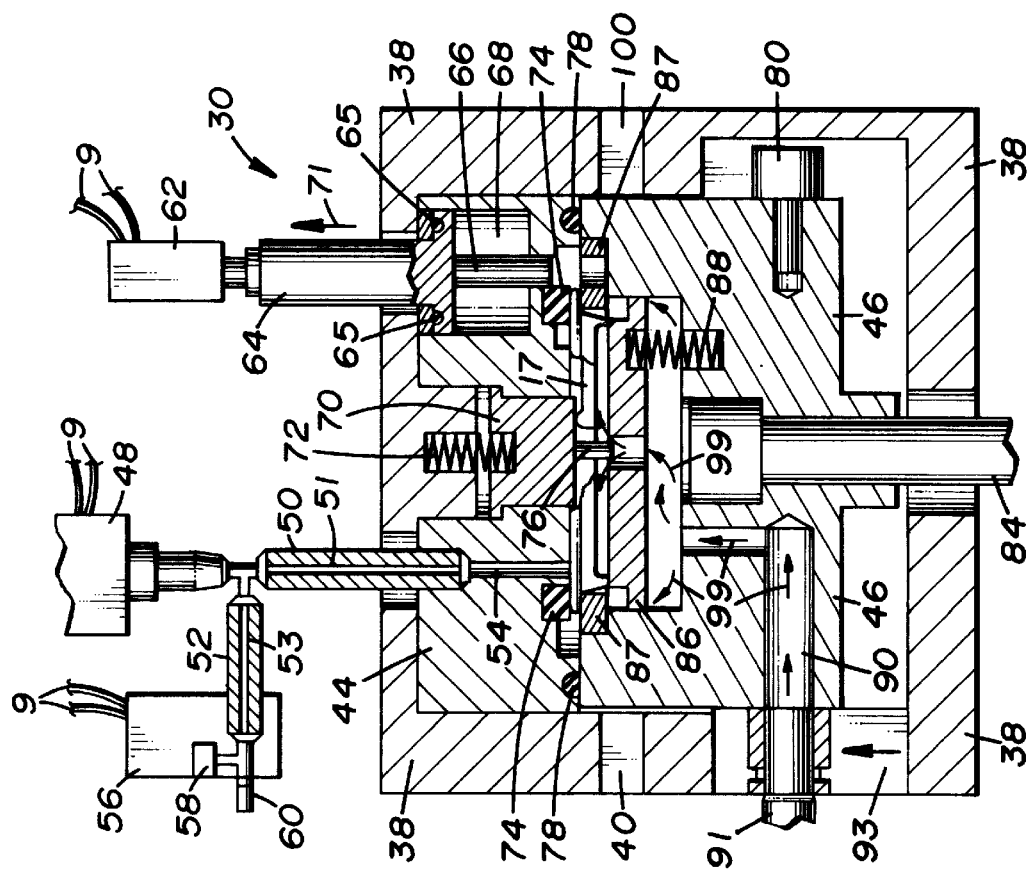
FIG. 7 is similar to FIG. 6 and is also an enlarged sectional view of the tester housing cut away to expose a container end positioned in the test pocket with air pressure introduced through the air passage in the lower housing member and the base plunger. The air pressure is applied on the bottom of the container end panel and around the sides of the chuck wall of the container end. In this drawing, there is leakage in the container end and the air leakage moves upwardly through an air passage connected to a nipple attached to the pressure transducer.

In FIG. 7, which is similar to FIG. 6, an enlarged sectional view of the tester housing 38 is shown cut away to expose a container end 18 positioned in the test pocket 42 with air pressure 99 introduced through air passage 90. As mentioned above, the air pressure 99 is applied on the underneath of the container end panel 21 and around the outer sides of the chuck wall 15 of the container end 18. In this drawing, there is leakage in the container end 18 and the air leakage moves upwardly through the air passage 54 in the upper housing member 44. The leakage continues upwardly through the air passage 51 in the nipple 50 prior to being sensed and measured by the pressure transducer 48. At this time, the pressure transducer 48, under computer control, makes hundreds of measurements depending on the time allotted. The longer the test period, the smaller the amount of leak that can be found.

As mentioned above, by locating the pressure transducer directly above the test pocket 42 in the leak testing device 30, very small leaks such as a 0.1 cc container end leaker can be detected and rejected. A 0.1 cc leaker is a container end that leaks 0.1 cubic centimeter (volume) of air under 10 psi for 10 seconds. This volume is about 1/10th the size of a sugar cube. Even small leakers of less than 0.1 cc can be detected by changing the time and air pressure sensed by the pressure transducer 48 during the testing of the container ends 18.

In FIG. 8, another sectional view of the tester housing 38 is shown cut away to expose a container end 18 exiting the test pocket 42 to the right through an exit port 100 in the housing 38 as indicated by arrow 102. Prior to the container end 18 leaving the test pocket 42, the test air pressure 99 is shut off through the air line 91 and the solenoid valve 58 opened by the solenoid 56 to vent any remaining air pressure out the air vent 60 to atmosphere. Also at this time, the lower housing member 46 and base plunger 86 and ring 87 are lower by the air actuator rod 84. The spring biased knock-off plunger 70 at the same is time urges the container end 18 downwardly in the test pocket 42 and the container end 18 falls by gravity outwardly through the exit port 100 completing the testing procedure. As mentioned in the discussion of FIG. 1, the pressure transducer 48, based on its reading, will indicate to the computer if the container end 18 is a leaker or not. If the container end is a leaker, the computer will direct the upstacker and tube cylinder 32 to reject the container end 18 into the reject catch tray 36. If the container end 18 is not a leaker, it will be upstacked into the accumulation tray 34.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A container end leak testing device used for testing a container end, the testing device under computer control and receiving outside test air pressure for testing for leaks in the surface of the container end, the testing device comprising:

a tester housing having an upper housing member, a lower housing member and a test pocket therebetween, said test pocket adapted for receiving and holding the container end therein, said upper housing member stationary in said tester housing, said upper housing having a pair of spaced apart downwardly extending guide pins and a downwardly extending retractable stop pin, said guide pins and said stop pin providing for alignment and centering of the container end when received in said test pocket and prior to the testing for leaks in the container end, said lower housing member retractable in said tester housing, said lower housing member retracted downwardly in said tester housing prior to when the container end is received in said test pocket, said lower housing member retracted upwardly in said tester housing for compressing the container end in said test pocket when testing the container end for leaks; and a pressure transducer connected directly to said upper housing member and communicating with said test pocket via a first air passage in said upper housing member, said pressure transducer able to test for small volumes of air pressure leaks in the container end;

said lower housing member having a second air passage therein for introducing test air pressure against the bottom of the container end in said test pocket.

2. The test device as described in claim 1 wherein said upper housing member includes an annular flat ring mounted in a lower portion thereof for engaging a portion of the container end during the testing of leaks in the container end.

3. The test device as described in claim 2 wherein said lower housing member includes a spring biased base plunger for engaging a bottom portion of the container end and compressing a top portion of the container end against said flat ring disposed in the lower portion of said upper housing member.

4. The test device as described in claim 1 further including a solenoid under computer control and connected to said pressure transducer, said solenoid having a solenoid valve which can be open for venting test air pressure to the atmosphere and can be closed during the testing of the container end.

5. A container end leak testing device used for testing a container end, the container end having a bottom portion, a top portion and an annular side therearound, the testing device under computer control and receiving outside test air pressure for testing for leaks in the surface of the container end, the testing device comprising:

a tester housing having a stationary upper housing member, a retractable lower housing member and a test pocket therebetween, said test pocket adapted for receiving the container end when said lower housing member is retracted downwardly and holding the container end therein when said lower housing member is retracted upwardly for compressing the container end in said test pocket, said upper housing member having a pair of spaced apart downwardly extending guide pins and a downwardly extending retractable stop pin attached to an air actuator, said air actuator extending and retracting a lower portion of said stop pin in said test pocket, said guide pins and said stop pin when in an extended position providing for alignment and centering of the container end when received in said test pocket and prior to testing for leaks in the container end; and a pressure transducer connected directly to said upper housing member and communicating with said test pocket via a first air passage in said upper housing member, said pressure transducer able to test for small volumes of air pressure leaks in the range of 0.1 cubic centimeters and less in the container end;

said lower housing member having a second air passage therein for introducing test air pressure against the bottom portion of the container end in said test pocket.

6. The test device as described in claim 5 wherein said upper housing member includes an inner annular flat ring and an outer "O" ring mounted in a lower portion thereof, said inner flat ring engaging a top portion of the container end during the testing of leaks in the container end and said outer "O" ring engaging a top portion of said lower housing member during the testing of leaks in the container end.

7. The test device as described in claim 6 wherein said lower housing member includes a spring biased base plunger and a upper hardened ring, said hardened ring for engaging the bottom portion of the container end and compressing the top portion of the container end against said inner flat ring disposed in the lower portion of said upper housing member.

8. The test device as described in claim 5 wherein said pressure transducer is connected to said upper housing via a nipple with an air passage therethrough, said air passage less than 0.10 inches in diameter for measuring small amounts of volumes of air leakage.

9. A container end leak testing device used for testing a container end, the container end having a bottom portion, a top portion and an annular side therearound, the testing device under computer control and receiving outside test air pressure for testing for leaks in the surface of the container end, the testing device comprising:

a tester housing having a stationary upper housing member, a retractable lower housing member and a test pocket therebetween, said test pocket adapted for receiving the container end when said lower housing member is retracted downwardly and holding the container end therein when said lower housing member is retracted upwardly for compressing the container end in said test pocket; said upper housing member having an inner annular flat ring, said inner flat ring engaging a top portion of the container end during the testing of leaks in the container end, said upper housing member having a pair of spaced apart downwardly extending guide pins and a downwardly extending retractable stop pin attached to an air actuator, said air actuator extending and retracting a lower portion of said stop pin in said test pocket, said guide pins and said stop pin when in an extended position providing for alignment and centering of the container end when received in said test pocket and prior to the testing for leaks in the container end; and a pressure transducer connected directly to said upper housing member and communicating with said test pocket via a first air passage in said upper housing member, said pressure transducer able to test for small volumes of air pressure leaks in the range of 0.1 cubic centimeters and less in the container end;

said lower housing member having a second air passage therein for introducing test air pressure against the bottom portion of the container end in said test pocket.

10. The test device as described in claim 9 wherein said lower housing member includes a upper hardened ring, said hardened ring for engaging a portion of the container end and said hardened ring compressing the container end against said inner flat ring disposed in the lower portion of said upper housing member.

11. The test device as described in claim 9 wherein said lower housing member includes a spring biased plunger, said plunger for engaging a portion of the container end and compressing the container end against said inner flat ring disposed in the lower portion of said upper housing member.

12. The test device as described in claim 9 wherein said pressure transducer is connected to said upper housing via a first nipple with an air passage therethrough, said air passage less than 0.10 inches in diameter for measuring small amounts of volumes of air leakage.

13. The test device as described in claim 12 further including a solenoid under computer control and connected to said pressure transducer via a second nipple with an air passage therethrough, said air passage less than 0.10 inches in diameter, said solenoid having a solenoid value which can be open for venting test air pressure to the atmosphere and can be closed during the testing of the container end.

14. The test device as described in claim 9 wherein said upper housing member includes an outer "O" ring mounted in a lower portion thereof, said outer "O" ring engaging a top portion of said lower housing member during the testing of leaks in the container end.

* * * * *